United States Patent

Hensler

[11] 3,873,408
[45] Mar. 25, 1975

[54] METHOD OF PRODUCING A REFRACTIVE INDEX GRADIENT IN GLASS

[75] Inventor: Joseph R. Hensler, Rochester, N.Y.

[73] Assignee: Bausch & Lomb Incorporated, Rochester, N.Y.

[22] Filed: Nov. 9, 1972

[21] Appl. No.: 304,970

Related U.S. Application Data

[63] Continuation of Ser. No. 868,267, Oct. 6, 1969, abandoned, which is a continuation of Ser. No. 703,282, Feb. 6, 1968, abandoned.

[52] U.S. Cl. .......................... 161/165, 65/30, 65/33, 161/166, 161/192
[51] Int. Cl. .............................................. C03c 21/00
[58] Field of Search ............ 65/30, 33, 60; 161/166, 161/165, 192

[56] References Cited
UNITED STATES PATENTS

| | | | |
|---|---|---|---|
| 2,075,446 | 3/1937 | Liebig | 65/30 |
| 2,344,250 | 3/1944 | Jones | 65/30 X |
| 3,419,370 | 12/1968 | Cramer et al. | 65/30 X |
| 3,449,103 | 6/1969 | Stookey | 65/30 |
| 3,542,535 | 11/1970 | Henslet et al. | 65/30 |
| 3,563,057 | 2/1971 | Rosenbauer | 65/30 |
| 3,627,491 | 12/1971 | Boffee et al. | 65/30 |
| 3,632,321 | 1/1972 | Plumat et al. | 65/30 |
| 3,677,729 | 7/1972 | Plumat | 65/30 |

FOREIGN PATENTS OR APPLICATIONS

| | | | |
|---|---|---|---|
| 1,018,890 | 3/1964 | Great Britain | 65/30 |

*Primary Examiner*—S. Leon Bashore
*Assistant Examiner*—Kenneth M. Schot
*Attorney, Agent, or Firm*—Hoffman Stone

[57] ABSTRACT

Method of increasing the refractive index of a surface layer of an alkali-silicate glass by diffusing ions of silver, thallium, copper, or combinations thereof into the glass at temperatures of about 800° to about 1,100°F. for at least about one hour. The resulting increase of the refractive index is graded, being greatest at the surface, and decreasing approximately uniformly as a function of depth. Penetration of about 0.3 to about 10 mm. are shown. Stable salts such as the chlorides are used as source materials for the ions.

7 Claims, 3 Drawing Figures

JOSEPH R. HENSLER
INVENTOR.

BY Frank C. Parker

ATTORNEY

METHOD OF PRODUCING A REFRACTIVE INDEX GRADIENT IN GLASS

This application is a continuation of co-pending application Ser. No. 868,267, filed Oct. 6, 1969 and now abandoned, which, in turn, was a continuation of my application, Ser. No. 703,282, filed Feb. 6, 1968, entitled "Method of Producing a Refractive Index Gradient in Glass," now abandoned.

BACKGROUND OF THE INVENTION

The present invention relates to a method of increasing the refractive index of a surface layer of substantial thickness in a body of an alkali silicate glass, and to bodies made thereby.

The practice of the invention provides the optical design engineer with a heretofore unavailable degree of freedom. It enables him to affect the first order design of optical systems by the use of elements having localized regions that differ in refractive index from other regions. Thus, instead of using an aspheric curvature, for example, a desired correction may be introduced by the use of a region, typically annular, of increased refractive index.

SUMMARY OF THE INVENTION

According to the invention, ions of silver, thallium, copper, or combinations of these ions are diffused into a surface layer of a glass body in a manner generally similar to the processes heretofore used for treating glass for other purposes. The diffusion, however, is carried out at higher temperatures and longer times than heretofore proposed, and the diffused ions may penetrate to greater depths than in any comparable diffusion process heretofore known. Penetrations of up to about ten millimeters have been achieved. The diffused ions serve to increase the refractive index of the surface portion of the glass into which they enter, thereby, for example, enabling control of the refraction of an optical element by adjusting the index rather than by adjusting its curvature.

It is known that alkali-silicate glasses that are substantially free of arsenic do not become stained by the introduction of silver or copper ions into them. If arsenic has been added to the glass during its manufacture, as is commonly done to promote fining, introduction of the silver or copper ions tends to discolor it slightly, and the color can thereafter be intensified by heating in a reducing atmosphere.

Since the present invention is primarily concerned with control of refractive index, it is thought that in most utilizations, the use of a glass substantially free of arsenic will be preferred. It is, however, also thought that in some utilizations pale coloring due to the heavy ions will be found tolerable, or even desirable, and for those uses glass with arsenic may be used.

The diffused ions appear to replace the monovalent alkali metal ions initially in the glass by an ion exchange process.

The diffusion of silver ions into a soda-containing glass is particularly advantageous, apparently because the silver ion is not very much larger than that of sodium, which it replaces, and because, silver being a transition element, its ion is polarized and can readily orient itself in the glass to a position where it creates minimum stress. Moreover, the process of the invention may, if desired, be carried out at temperatures above the strain point of the glass so that any strains due to ion exchange are quickly relieved.

DESCRIPTION OF THE PREFERRED EMBODIMENTS

I have found that when glasses composed of $Na_2O$-$Al_2O_3$-$SiO_2$ are maintained in contact with molten AgCl for prolonged periods of time the $Ag^+$ ion replaces the $Na^+$ ion at and inwardly of the surface of the glass in contact with the molten bath. Replacing $Na^+$ with $Ag^+$ in these glasses results in a refractive index change at and inwardly of the surface of the glass undergoing such ion replacement. In glasses that are substantially free of arsenic, there is no coloring of the glass or change in its optical clarity. It has further been found that the index change produced by this process is, in the usual case, at a maximum at the surface in contact with the molten bath and decreases gradually from this surface toward the other side of the sample.

The silver ion exchanged for sodium ions is particularly advantageous because the relative sizes of both ions are such that there are no high stresses induced by the exchange and therefore diffusion is not limited, nor is the glass destroyed by induced stresses.

The method of the present invention is particularly adaptable for use with glasses of the following compositions:

| Element | % by Weight |
|---------|-------------|
| $SiO_2$ | 51–71 |
| $Al_2O_3$ | 0–26 |
| $Na_2O$ | 7–35 |
| $K_2O$ | 0–15 |
| $CaO$ | 0–10 |
| $MgO$ | 0–6 |
| $B_2O_3$ | 0–6 |

For example, a sample of glass measuring 35 mm. × 35 mm. × 15 mm. and containing, by weight, 67.00% $SiO_2$, 7.4% $Al_2O_3$, and 25.6% $Na_2O$ was maintained in contact with a bath of molten AgCl at 1,100°F. for 24 hours. After this treatment, the refractive index at the surface was found to have increased 0.013, from 1.502 to 1.515. There was a zone of decreasing index from the surface, reaching 1.502 at a depth of 3.3 mm. An identical sample was maintained in contact with molten AgCl at 1,100°F. for 48 hours resulting in an increase in the refractive index of 0.016 at the surface in contact with the bath. This sample contained a refractive index gradient to a depth of 6.5 mm.

The following Table I illustrates the effect of composition on the maximum index change ($\Delta n_D$) produced at the surface, and the depth of the index gradient. The symbol $n_D$ refers to the index of refraction for the D-line of sodium (5893 A) in the middle of the visible spectrum. All of the samples in Table I were maintained in contact with molten AgCl at 1,000°F. for 24 hours.

TABLE I

| Sample No. | Composition (wt %) | | | $\Delta n_D$ (Max) | Penetration (mm) |
|---|---|---|---|---|---|
| | $SiO_2$ | $Al_2O_3$ | $Na_2O$ | | |
| 1 | 67.0 | 7.4 | 25.6 | 0.0192 | 2.6 |
| 2 | 70.4 | 11.2 | 18.4 | 0.015 | 0.6 |
| 3 | 67.7 | 12.2 | 20.1 | 0.018 | 1.0 |
| 4 | 55.1 | 22.5 | 22.5 | 0.019 | 1.2 |
| 5 | 65.9 | — | 34.1 | 0.0165 | 3.4 |

Figure 1:
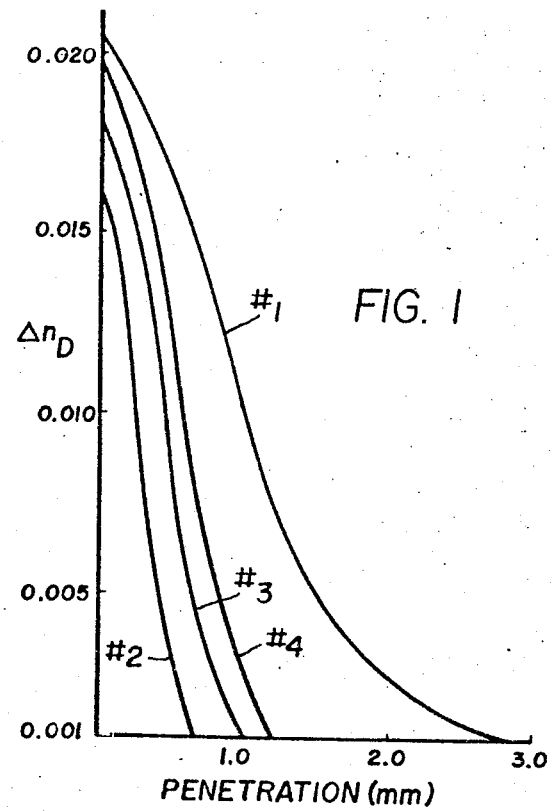
FIG. 1 depicts the effect of composition on the change in index of refraction and depth of penetration after exposure to molten silver chloride for 24 hours at 1,100°F.

From Table I it is evident that the maximum index change and the depth of the index gradient can be controlled by varying the composition of the glass to be treated. This is further shown in FIG. 1 where $\Delta n_D$ is plotted against penetration in millimeters for samples 1, 2, 3, and 4 of Table I.

Further control can be achieved by varying the time, temperature, or the time-temperature cycle, or all of these to control the maximum index change and depth of penetration.

This is shown in Table II wherein samples of glass composition 1 (Table I) were treated for various times and temperatures.

Figure 2:
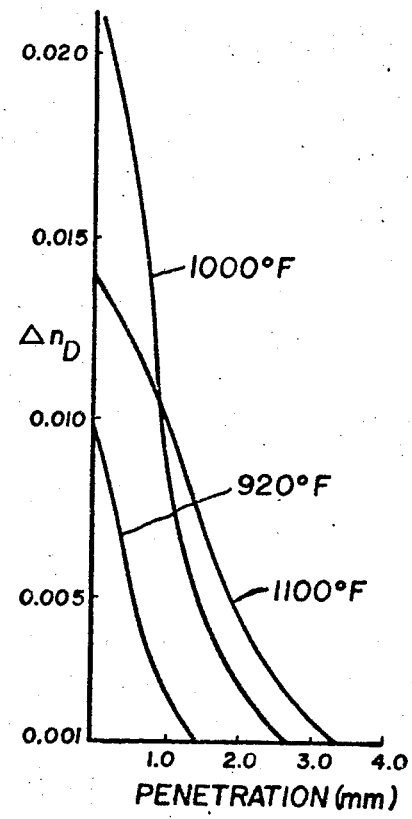
FIG. 2 depicts the effect of temperature on the change in index of refraction and depth of penetration after exposure of samples of identical composition to a bath of silver chloride for 24 hours at different temperatures.

FIG. 2 shows $\Delta n_D$ plotted against penetration in millimeters for samples of glass composition 1 contacted with molten AgCl for 24 hours at, respectively, 920°F., 1,000°F., and 1,100°F. It is apparent from this data that for a given time period increasing the temperature will increase the depth of penetration but not necessarily the maximum change in index of refraction at the surface in contact with the AgCl.

Figure 3:
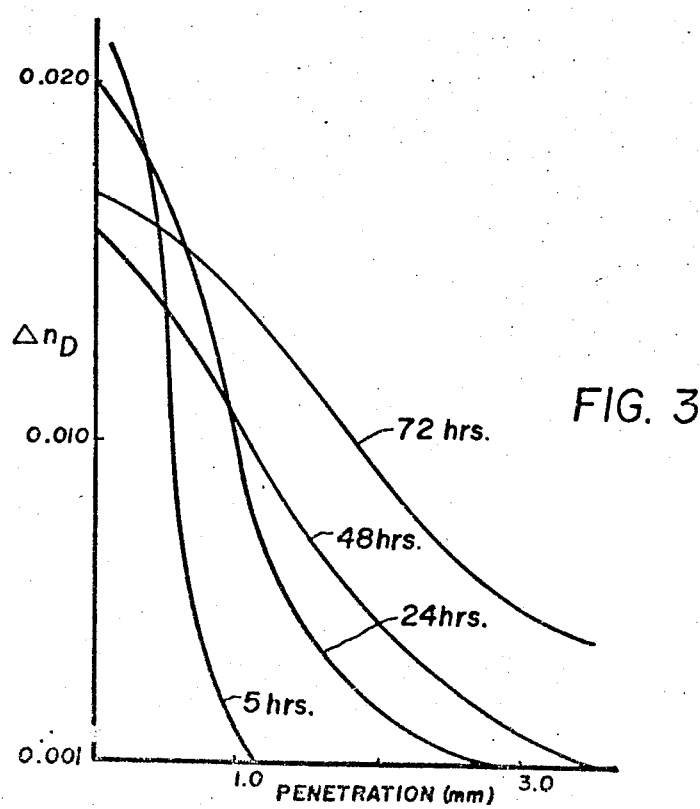
FIG. 3 depicts the effect of time on the change in index of refraction and depth of penetration after exposure of samples of identical composition to a bath of silver chloride at 1,000°F. for varying times.

FIG. 3 shows $\Delta n_D$ plotted against penetration in millimeters for samples of glass composition 1 contacted with molten AgCl at 1,000°F. for, respectively, 5, 24, 48, and 72 hour periods. From this data it is apparent that for a given temperature, increasing the exposure time leads to increasing the depth of penetration but not necessarily to increasing the maximum change in index of refraction at the surface in contact with the AgCl.

It has been found that for longer periods of exposure fresh AgCl must be added to the bath to increase the maximum $\Delta n_D$ at the surface in contact with the bath. The timing of the addition will vary, but generally it will be necessary after exposure for about 5 hours. Why this happens is not known; however, it does happen and affords another control parameter for the diffusion process.

In addition, other elements beside $Na_2O$, $Al_2O_3$ and $SiO_2$ may be added to the basic glass compositions for varying the properties of the glass without destroying their usefulness to the instant invention. Table III sets forth a series of glasses with components in addition to $Na_2O$, $Al_2O_3$, and $SiO_2$ which were exposed to molten AgCl at 1,000°F. for 24 hours.

TABLE III

| Sample No. | Composition (wt%) | | | | | | $\Delta n_D$ (Max) | Penetration mm | Max. Ag |
|---|---|---|---|---|---|---|---|---|---|
| | $SiO_2$ | $Al_2O_3$ | $Na_2O$ | CaO | MgO | $B_2O_3$ | | | |
| 6 | 57.0 | 7.4 | 25.6 | 10 | — | — | 0.0293 | 1.85 | 11.4 |
| 7 | 57.0 | 7.4 | 25.6 | 4.0 | 2.0 | 4.0 | 0.0203 | 1.75 | 7.9 |
| 8 | 57.0 | 7.4 | 25.6 | 3.0 | 1.0 | 6.0 | 0.0172 | 1.85 | 6.7 |
| 9 | 59.0 | 7.4 | 25.6 | 4 | — | 4.0 | 0.0167 | 2.1 | 6.5 |
| 10 | 61.0 | 7.4 | 25.6 | — | — | 6.0 | 0.0208 | 2.45 | 8.1 |
| 11 | 67.0 | 7.4 | 25.6 | — | — | — | 0.0192 | 2.6 | 7.4 |

TABLE II

| Time | Temperature | $\Delta n_D$ (max) | Max. Penetration (mm) |
|---|---|---|---|
| 1 hr. | 920°F | 0.00875 | 0.4 |
| 5 hrs. | 920°F | 0.0134 | 0.7 |
| 24 hrs. | 920°F | 0.00976 | 1.4 |
| 1 hr. | 1000°F | 0.0256 | 2.1 |
| 5 hrs. | 1000°F | 0.0243 | 2.5 |
| 24 hrs. | 1000°F | 0.0192 | 2.6 |
| 48 hrs. | 1000°F | 0.0130 | 3.8 |
| 72 hrs. | 1000°F | 0.0153 | 7.5 |
| 168 hrs. | 1000°F | 0.0155 | 7.5 |
| 1 hr. | 1100°F | 0.0170 | 0.7 |
| 5 hrs. | 1100°F | 0.0200 | 1.5 |
| 24 hrs. | 1100°F | 0.0140 | 3.2 |
| 48 hrs. | 1100°F | 0.0145 | 6.4 |
| 72 hrs. | 1100°F | 0.0170 | 6.7 |

As can be seen in Table III, compositional variations can be used to control the maximum index change and the depth of penetration of the index gradient. In the above examples, only the maximum silver content at the surface in contact with the bath was analytically determined. The values for maximum $n_D$ were calculated using the formula $\Delta n_D = \%Ag \times 0.00257$. This formula was developed from several melts where both $n_D$ and Ag content were measured and can be considered useful for rough calculating purposes.

I have discovered that when the sodium in the glass is partially replaced by potassium, the method of the instant application is applicable. Table IV compares two glasses, one of which has sodium partially replaced by potassium, after a 24 hour treatment in molten AgCl at 1,000°F.

TABLE IV

| Sample No. | Composition (wt %) | | | | $\Delta n_D$ (max.) | mm. | Penetration Max. Ag |
|---|---|---|---|---|---|---|---|
| | $SiO_2$ | $Al_2O$ | $Na_2O$ | $K_2O$ | | | |
| 12 | 67.0 | 7.4 | 25.6 | — | 0.0192 | 2.6 | 7.40 |
| 13 | 67.0 | 7.4 | 13.6 | 12.0 | 0.0250 | 1.2 | 9.35 |

I have also found that an index gradient can be produced in the silica-soda-aluminate glasses by contacting glass with molten thallium chloride. For example, a sample of glass composition 1 (Table I) was held in contact with molten thallium chloride for twenty-four hours at 800°F. After this treatment, the index of refraction had increased 0.07 at the surface and there was an index gradient to a depth of 0.3 millimeters.

A sample of a glass containing, by weight, 50% $SiO_2$, 18% $Al_2O_3$, and 32% $Na_2O$ was held in contact with molten thallium chloride at 1,000°F. for 27 hours. This sample showed a maximum increase in $n_D$ of 0.078 and penetration of the gradient to 10 millimeters.

In addition, I have found that $\Delta n_D$ and penetration can be controlled by using a mixed bath of thallium and silver chloride, or exposure in alternate sequence to molten silver chloride and thallium chloride. Examples of these two techniques are as follows:

| Sample No. | Bath Composition | Time (hrs.) | Temp. (°F) | Max. $\Delta n_D$ | Penetration (mm.) |
|---|---|---|---|---|---|
| 14 | (50% Tl Cl (50% Ag Cl | 27 | 1000 | 0.0142 | 1.9 |
| 15 | (a) Ag Cl | 4 | 1000) | | |
|  | (b) Tl Cl | 8 | 1000) | 0.0243 | 2.8 |

Sample 14 contained, by weight, 50% $SiO_2$, 10% $Al_2O_3$, and, 32% $Na_2O$, and was exposed to the mixed chloride bath. Sample 15 was identical in composition to sample 1 (Table I) and exposed to AgCl first, and then to TlCl for four and eight hours, respectively.

The $Cu^+$ ion may also be used in place of $Ag^+$ or $Ti^+$. I have found, however, that maintaining the $Cu^+$ ion is more difficult than maintaining $Ag^+$ or $Tl^+$ available to the sample for diffusion into it.

While the invention has been disclosed by reference to a preferred embodiment, it should be understood that it may be modified or embodied in other forms without departing from the spirit and scope of the appended claims.

What is claimed is:

1. Method of increasing the refractive index of a surface layer of predetermined depth of a glass body consisting essentially of, by weight, batch basis, 51% to 71% silica, up to 26% alumina, 7% to 35% soda, up to 15% potash, up to 10% lime, up to 6% magnesia, and up to 6% boric acid, anhydrous basis comprising the step of maintaining the body in contact with a molten source of ions for at least 1 hour at a temperature between 800°F. and 1,100°F., the ions being selected from the group consisting of silver, thallium, and copper ions, and mixtures thereof, thereby to cause the selected ions to diffuse into the body to the predetermined depth.

2. Method according to claim 1 wherein the glass body is substantially free of arsenic, whereby the diffused ions do not introduce significant color into the surface layer.

3. Method according to claim 1 wherein the molten source is a stable salt.

4. Method according to claim 1 wherein the molten source consists essentially of a substance selected from the group consisting of silver chloride, thallium chloride, copper chloride, and mixtures thereof.

5. Method of increasing the refractive index of a surface layer at least about 0.4 mm. thick of a body of glass consisting essentially of, by weight, batch basis, 51% to 71% silica, up to 26% alumina, 7% to 35% soda, up to 15% potash, up to 10% lime, up to 6% magnesia, and up to 6% boric acid, anhydrous basis comprising the step of maintaining the body in contact with molten silver chloride at a temperature of at least 920°F. for at least one hour.

6. A glass body having a zone adjacent to a surface thereof and at least about 0.3 mm. thick in which the refractive index is higher than the refractive index of the bulk of the body and varies as a function of distance from the surface being highest at the surface, the bulk of said body consisting essentially of, by weight, batch basis, 51% to 71% silica, up to 26% alumina, 7% to 35% soda, up to 15% potash, up to 10% lime, up to 6% magnesia, and up to 6% boric acid, anhydrous basis, and said zone including ions selected from the group consisting of silver, thallium, and copper ions, and mixtures thereof, the concentration of said ions being greatest at the surface.

7. A glass body having a zone adjacent to a surface thereof and at least about 0.3 mm. thick in which the refractive index is higher than the refractive index of the bulk of the body and varies as a function of distance from the surface being highest at the surface, the bulk of said body consisting essentially of, by weight, batch basis, 51% to 71% silica, up to 26% alumina, 7% to 35% soda, up to 15% potash, up to 10% lime, up to 6% magnesia, and up to 6% boric acid, anhydrous basis, and said zone including ions of silver, the concentration of said ions being greatest at the surface.

* * * * *